Figure 1:
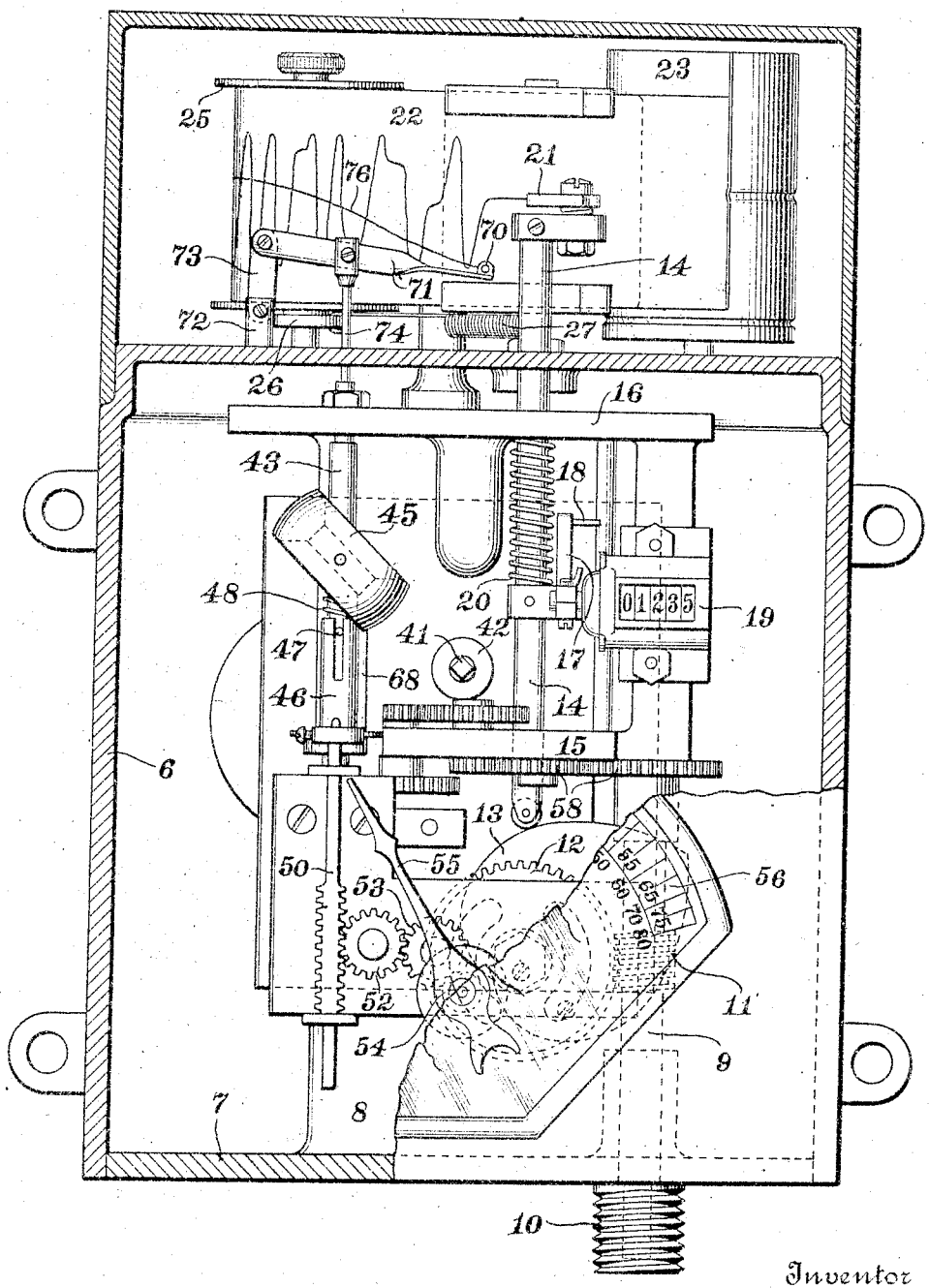

T. J. BARRETT.
DISTANCE AND SPEED INDICATOR AND RECORDER.
APPLICATION FILED JUNE 8, 1915.

1,277,359.

Patented Sept. 3, 1918.
2 SHEETS—SHEET 1.

Inventor
Thomas J. Barrett
By his Attorneys

T. J. BARRETT.
DISTANCE AND SPEED INDICATOR AND RECORDER.
APPLICATION FILED JUNE 8, 1915.

1,277,359.

Patented Sept. 3, 1918.
2 SHEETS—SHEET 2.

Inventor
Thomas J. Barrett,
By his Attorneys

UNITED STATES PATENT OFFICE.

THOMAS J. BARRETT, OF IRVINGTON, NEW JERSEY, ASSIGNOR, BY MESNE ASSIGN-MENTS, TO AUTOGRAPHIC RECORDER COMPANY, OF NEWARK, NEW JERSEY, A CORPORATION OF NEW JERSEY.

DISTANCE AND SPEED INDICATOR AND RECORDER.

1,277,359.    Specification of Letters Patent.    Patented Sept. 3, 1918.

Application filed June 8, 1915. Serial No. 32,859.

*To all whom it may concern:*

Be it known that I, THOMAS J. BARRETT, a citizen of the United States, residing at Irvington, county of Essex, State of New Jersey, have invented certain new and useful Improvements in Distance and Speed Indicators and Recorders; and I do hereby declare the following to be a full, clear, and exact description of the invention, such as will enable others skilled in the art to which it appertains to make and use the same.

This invention relates to instruments for use in indicating and recording the distance and speed of travel of a vehicle, such as a locomotive or an automobile.

I have heretofore devised an instrument for this use having a shaft adapted to be driven by a wheel of the vehicle, a rod which is reciprocated axially by the shaft, a marker carried by the rod and a traveling tape driven by a clock mechanism and coöperating with the marker so that the tape receives a series of waves the shape of which is indicative of the speed of travel of the vehicle at all times throughout the period of use of the instrument. In combination with these parts, a counter was provided for registering the total distance traveled by the vehicle and also a centrifugal speed indicator actuated by the shaft driven from the wheel of the vehicle and operating an index adapted to move over a suitable scale. I have found that the utility of such an instrument may be greatly increased by the provision of a second recording device for making a record of the speed of travel of the vehicle by means of a second marker upon the traveling tape, this second recording means being actuated directly from the centrifugal member of the speed indicator. The record of speed so made is more direct in its readings and may therefore be more readily understood. Furthermore, the direct connection of the second marker to the centrifugal member, which member also is directly connected to the speed indicator, makes the curve drawn by this second marker an exact record of what was seen or should have been seen by the engineer of the locomotive or the operator of the vehicle, so that opportunity for differences of opinion as to the accuracy of the readings of the instrument or the soundness of conclusions drawn from the records is greatly decreased or wholly eliminated. I have therefore improved and increased the utility of the instrument heretofore devised by me by combining with the speed recorder, consisting of a reciprocating rod and a marker thereon adapted to draw a wavy line upon a traveling tape, and the speed indicator actuated by a centrifugal member, a second speed recorder actuated directly by the centrifugal member and adapted to draw a curve on the tape the shape of which is directly proportional to changes in the speed of travel of the vehicle.

Figure 2:
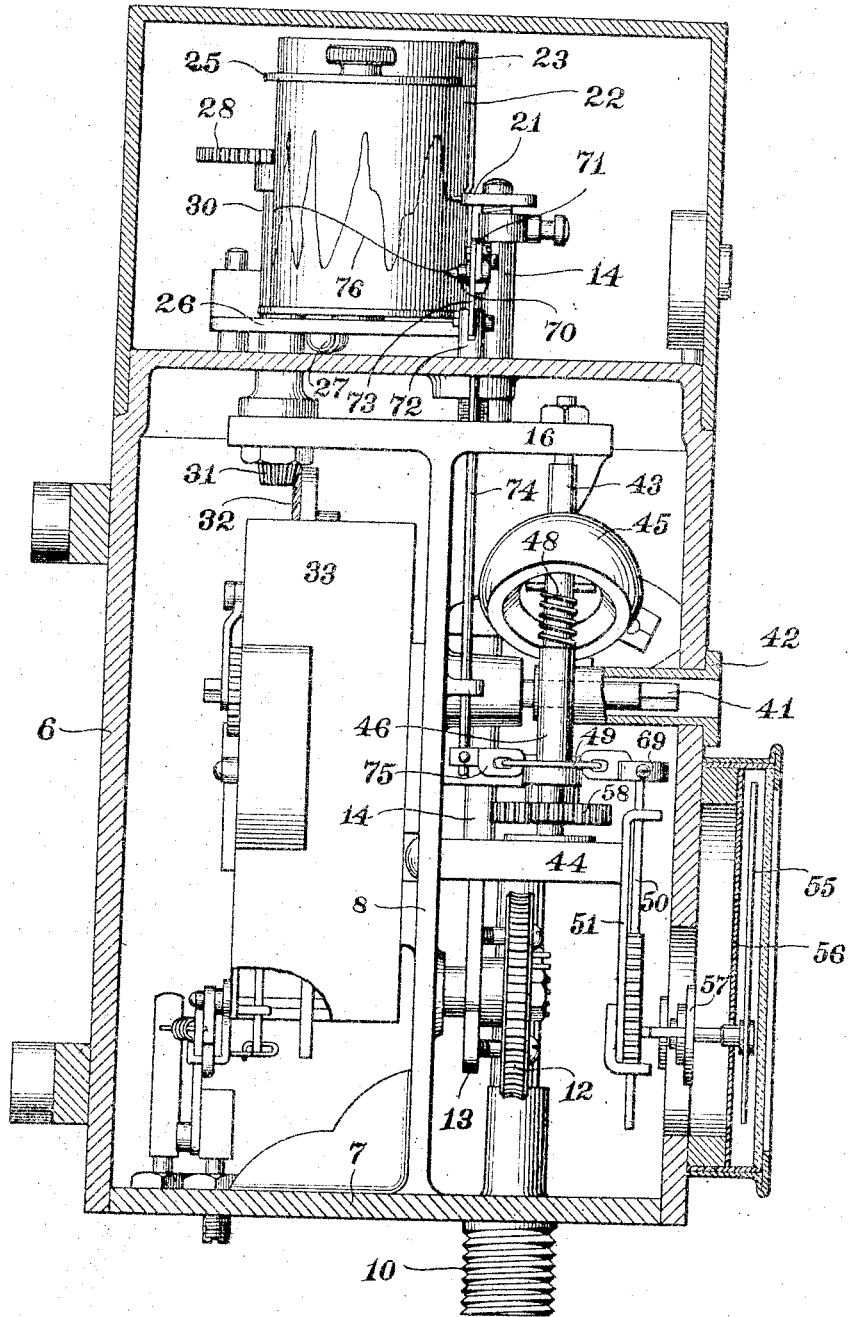

I have illustrated the preferred embodiment of my invention in the accompanying drawings, in which Figure 1 is a front view of the instrument broken away in part, and Fig. 2 is a vertical section of the instrument.

Referring to these drawings, the instrument is inclosed within a rectangular casing 6 having a removable base plate 7 upon which most of the operating mechanism is mounted. A supporting structure 8 is cast integral with the plate 7 and in this structure is a bearing for a rotary shaft 9. This shaft is adapted to be driven from the wheel of the locomotive or other vehicle and the plate 7 is provided with a boss 10 through which connection is made to the shaft 9. On the shaft 9 is a worm 11 meshing with the worm wheel 12 mounted for rotation on a stub shaft journaled in the support 8. This shaft also carries a heart-shaped cam 13 adapted to actuate a reciprocating rod 14 which is supported in bearings formed in shelves 15 and 16 cast integral with the support 8. The rod 14 carries a roller at its lower end adapted to travel upon the periphery of the cam 13. Secured on the rod 14 is an arm 17 to which pins 18 are affixed. These pins lie on opposite sides of the operating arm of a counter 19 so that as the rod 14 is moved up and down, the pins 18 operate the counter once for each reciprocatory movement of the rod 14, that is, once for each revolution of the cam 13. Between the arm 17 and shelf 16 is a spring 20 coiled upon the rod 14, this spring serving to move the rod 14 downwardly and hold its lower end in contact with the periphery of cam 13.

The upper end of rod 14 extends through an opening in the casing 6 and on its upper end this rod carries a marker 21 of any suitable construction adapted to mark upon a tape 22. This tape is supplied from a receptacle 23 and passes over a supporting surface which supports the tape at the point where the marks are made by the marker 21. The tape is wound upon a roller 25 which is carried by an arm 26 pivotally mounted upon the top of the casing 6 and adapted to be turned upon its pivot by a coiled spring 27. The tape is fed at a uniform rate of speed by a disk 28 whose edge is knurled as shown. The periphery of this disk engages the paper wound upon the roller 25, the paper being held in engagement with the disk by the spring 27. The paper-feeding disk 28 is mounted upon the upper end of a shaft which passes through a cylindrical holder 30 mounted on the top of the casing 6 and down into the casing; at its lower end it carries a gear 31 which meshes with a crown gear 32 carried by one of the shafts of a clock mechanism 33 which is secured to the rear face of the support 8. This clock mechanism may be rewound by applying a key to the squared end of the shaft 41 of the main spring. This end of the shaft extends into the sleeve 42 mounted in an opening in the front wall of the casing 6.

A shaft 43 is mounted for rotation in bearings formed in the shelf 16 and in a shelf 44 projecting forwardly from the support 8. This shaft 43 has a centrifugal member 45 pivotally mounted thereon and preferably in the form of a ring. Shaft 43 also carries a sleeve 46 slotted to receive a pin 47 on the shaft so that the sleeve will rotate with the shaft. This sleeve is normally pressed downwardly by a spring 48 coiled on the shaft 47, but it may be raised against the tension of the spring by turning movement of the centrifugal member 45. For this purpose the member 45 is connected by a rod 68 to a disk 49 secured to the lower end of the sleeve 46. The disk 49 is connected to the upper end of a reciprocating rack 50 by means of a yoke 69 secured to the upper end of the rack 50 and having its arms lying on opposite sides of the disk. The rack 50 is mounted for vertical movement in a holder 51. The teeth of the rack mesh with a gear 52 and an intermediate gear 53 connects the gear 52 with a gear 54 on the shaft of an index 55. The shaft of this index passes through an opening in the front wall of the casing 6 and the index is adapted to move over a suitable scale 56 covered by glass and marked off with spaces properly designated, as for instance, in miles per hour. A spring 57 is connected at one end to the shaft of the index 55 and at the other end to an adjacent portion of the casing; this spring serves to retract the index 55 to the zero position and also acts through the gearing above described to move the rack 50 as the sleeve 46 moves downwardly. The shaft 43 is driven from the shaft 9 through speed multiplying gearing so that shaft 43 is rotated at a speed substantially in excess of that of the shaft 9. For this purpose a train of gears 58 is shown mounted upon the shelf 15 and serving to transmit the rotary motion of shaft 9 to shaft 43.

A second marker is provided for drawing a curve upon the traveling tape, this marker being actuated directly from the centrifugal member 45 so that its movements follow exactly the movements of the speed indicator 55 and so that the curve drawn by the marker shall be an exact record of the indicated speed. The second marker is shown at 70. It is carried by a pivoted arm 71 mounted upon a stud 72 extending upwardly from the top of the casing 6. The arm is mounted on the stud by means of a link 73 pivotally connected at one end to the arm and at the other to the stud so that the point of pivotal connection of the arm 71 to the link may move horizontally while the arm is being turned about its pivot. The arm 71 is actuated in accordance with the angular movements of the centrifugal member 45 by means of a rod 74 connected to the arm 71 and extending downwardly therefrom through openings in the top of the casing 6 and in the shelf 16. At its lower end, the rod 74 carries a yoke 75 similar to yoke 69 and having its arms extending on opposite sides of the disk 49.

The operation of the instrument thus constructed will be understood from the foregoing description of the construction. The shaft 9 is driven from the wheel of the vehicle and serves to rotate the cam 13 through the gears 11 and 12. The cam thus rotated reciprocates the rod 14 and thus causes actuation of the counter 19 to register the total distance of travel of the vehicle. Also, as the rod 14 is reciprocated, the marker 21 thereon is moved up and down across the traveling tape 22 and draws a wavy curve on the tape, as shown in Fig. 1. The shape of the curve so drawn and the distance between successive undulations of the curve form a permanent record of the speed of travel of the vehicle. Also, when the shaft 9 is rotated, the shaft 43 is simultaneously rotated, and as its speed varies, the angular position of the centrifugal member 45 varies accordingly. Such angular movement of the member 45 causes movement of the index 55 over its scale 56 so that the position of the index with reference to its scale indicates at any time the speed of travel of the vehicle at that time. Also, the angular movement of the member 45 is accompanied by simultaneous and proportional movement of the arm 71 carrying the second marker 70, so that a second curve is drawn upon the traveling tape 22 by the marker 70, which curve corresponds exactly with the positions assumed by the index 55 with reference to the scale 56. This curve is therefore a direct reading record of the speed of the vehicle and a permanent record of what was seen or should have been seen by the operator of the vehicle by reference to the index 55 and scale 56. In the drawings, the curve drawn by the second marker 70 is represented at 76; however, only the general form of this curve is illustrated, no effort being made to have the shape of the curve conform to the speeds indicated by the shape of the curve made by the marker 21.

What I claim is:

1. In a vehicle speed and distance indicator mechanism having a shaft adapted to be driven at variable speed, with a cam mounted thereon for actuating a rod provided with a marker adapted to move over a tape that is driven by a clock mechanism to produce an undulating record from which the speed of the vehicle may be determined, and provided also with a centrifugal member driven by the shaft and adapted through actuating mechanism to move an indicator to show directly the speed of the vehicle, the combination with said centrifugal member, of a member responsive to the movements thereof, and a marker associated with the member for producing on the tape a record corresponding to the movements of the indicator, thereby giving a record of the speed of the vehicle which may be read directly; substantially as described.

2. In a vehicle speed and distance indicator mechanism having a shaft adapted to be driven at variable speed, with a cam mounted thereon for actuating a rod provided with a marker adapted to move over a tape that is driven by a clock mechanism to produce an undulating record from which the speed of the vehicle may be determined, and provided also with a centrifugal member driven by the shaft and adapted through actuating mechanism to move an indicator to show directly the speed of the vehicle, the combination with said centrifugal member, of a member responsive to the movements thereof, an arm connected to said member, and a marker on the end of the arm adapted to produce on the tape a record corresponding to the movements of the indicator, thereby giving a record of the speed of the vehicle which may be read directly; substantially as described.

3. In a vehicle speed and distance indicator mechanism having a shaft adapted to be driven at variable speed, with a cam mounted thereon for actuating a rod provided with a marker adapted to move over a tape that is driven by a clock mechanism to produce an undulating record from which the speed of the vehicle may be determined, and provided also with a centrifugal member driven by the shaft and adapted through a sleeve and gearing to move an indicator to show directly the speed of the vehicle, the combination with said centrifugal member, of an arm, a marker mounted on one end of the arm in position for marking upon the tape, a link pivotally connected to the other end of the arm, a support to which the link is pivotally connected, and a rod connecting the arm to the sleeve, whereby the mark made by the marker shall correspond at all times to the indications of said index; substantially as described.

In testimony whereof I affix my signature.

THOMAS J. BARRETT.